US011210805B2

(12) United States Patent
Bao et al.

(10) Patent No.: US 11,210,805 B2
(45) Date of Patent: Dec. 28, 2021

(54) SIMULTANEOUS LOCALIZATION AND DENSE THREE-DIMENSIONAL RECONSTRUCTION METHOD

(71) Applicant: ZHEJIANG UNIVERSITY, Hangzhou (CN)

(72) Inventors: Hujun Bao, Hangzhou (CN); Guofeng Zhang, Hangzhou (CN); Haomin Liu, Hangzhou (CN); Chen Li, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 287 days.

(21) Appl. No.: 16/477,194

(22) PCT Filed: Jan. 13, 2017

(86) PCT No.: PCT/CN2017/071131
§ 371 (c)(1),
(2) Date: Oct. 17, 2019

(87) PCT Pub. No.: WO2018/129715
PCT Pub. Date: Jul. 19, 2018

(65) Prior Publication Data
US 2020/0043189 A1   Feb. 6, 2020

(51) Int. Cl.
*G06T 7/73*       (2017.01)
*G06T 7/593*      (2017.01)
*G06T 17/00*      (2006.01)

(52) U.S. Cl.
CPC .......... *G06T 7/593* (2017.01); *G06T 7/75* (2017.01); *G06T 17/00* (2013.01)

(58) Field of Classification Search
CPC .......... G06T 7/593; G06T 7/75; G06T 17/00; G06T 2219/2004; G06T 19/20;
(Continued)

(56) References Cited

U.S. PATENT DOCUMENTS

2010/0033484 A1* 2/2010 Kim .................. G06T 19/006
                                                345/426
2014/0225985 A1* 8/2014 Klusza ............... H04N 13/271
                                                348/43
(Continued)

FOREIGN PATENT DOCUMENTS

CN    105809681 A    7/2016
CN    106127739 A    11/2016
CN    106251399 A    12/2016

OTHER PUBLICATIONS

International Search Report (PCT/CN2017/071131); dated Jan. 13, 2017.
(Continued)

*Primary Examiner* — Christopher M Brandt
(74) *Attorney, Agent, or Firm* — W&G Law Group

(57) ABSTRACT

A simultaneously localization and dense three-dimensional reconstruction method, being capable of processing rapid motion and frequent closing of a loop in a robust manner, and operating at any time in a large-scale scene. Provided by the method is a key frame-based simultaneous localization and map construction framework. First, depth and color information are used simultaneously, and the framework may operate on central processing unit (CPU) at high speed based on localization of the key frame, and operate in challenging scene in robust manner. To reduce accumulated errors, the method introduces increment bundle adjustment, which may greatly reduce an operation amount and enable local and global bundle adjustment to be completed in a unified framework. Secondly, provided by the method is a key frame-based fusion method, and a model may be generated online and a three-dimensional model may be updated in real time during adjustment of the key frame's pose.

5 Claims, 4 Drawing Sheets

(58) Field of Classification Search
CPC . G06T 2200/08; G06T 7/579; G06T 2200/04; G06T 2207/10016
See application file for complete search history.

(56) References Cited

U.S. PATENT DOCUMENTS

2016/0284123 A1* 9/2016 Hare .................. G06K 9/00912
2018/0005015 A1* 1/2018 Hou .................... G06K 9/00201

OTHER PUBLICATIONS

"Multi-View Depth Map Sampling for 3D Reconstruction of Natural Scene" Jiang, Hanqing et al. [Oct. 31, 2015].
"Approximate Surface Reconstruction and Registration for RGB-D SLAM" Holz, D. et al. [Sep. 4, 2015].

* cited by examiner

SIMULTANEOUS LOCALIZATION AND DENSE THREE-DIMENSIONAL RECONSTRUCTION METHOD

TECHNICAL FIELD

The present disclosure relates to a simultaneous localization and dense three-dimensional reconstruction method applicable to the fields of augmented reality, virtual reality, robot navigation and the like, and more particularly, to a simultaneous localization and dense three-dimensional reconstruction method.

BACKGROUND

Simultaneously Locating and Mapping (SLAM) is a fundamental problem in the field of robotics and computer vision. In the past few years, real-time Structure from Motion and visual SLAM have had many successful applications. However, it is difficult for visual SLAM to deal with a texture-less scene, and it is also difficult to stably recover a dense three-dimensional structure in real time. Using depth sensors can help to solve these two problems. With the popularity of depth sensors (such as Microsoft Kinect and Intel RealSense 3D cameras), a number of RGB-D based SLAM schemes have been proposed.

Most dense SLAM methods use frame-to-frame or frame-to-model alignment methods. It is easy to accumulate errors in this type of methods, and a failure occurs easily in challenging scenes. Some methods propose to use a non-rigid grid deformation optimization model to reduce the cumulated error. However, model errors due to inaccurate alignment cannot be eliminated, and alignment errors will be further increased.

Recently, BundleFusion [A. Dai, M. Nießner, M. Zollhöfer, S. Izadi, and C. Theobalt. BundleFusion: Real-time globally consistent 3d reconstruction using online surface re-integration. arXiv preprint arXiv:1604.01093, 2016.] proposed an end-to-end real-time reconstruction system. BundleFusion uses all RGB-D input data to hierarchically optimize all camera poses and three-dimensional models. Unlike the above-mentioned frame-to-model alignment method, BundleFusion uses a brute force match between all frames to obtain the camera pose. To this end, BundleFusion uses two powerful GPUs (NVIDIA GeForce GTX Titan X and GTX Titan Black) to achieve a real-time operation. Moreover, it stores all input data, which has a huge memory consumption so that its running scene size and runtime are limited.

In recent years, many researchers have proposed different methods for dense three-dimensional reconstruction and real-time SLAM based on RGB-D cameras. Huang [A. S. Huang, A. Bachrach, P. Henry, M. Krainin, D. Maturana, D. Fox, and N. Roy. Visual odometry and mapping for autonomous flight using an RGB-D camera. In Robotics Research—The 15th International Symposium ISRR, 9-12 Dec. 2011, Flagstaff, Ariz., USA, pages 235-252, 2011.] et al. proposed real-time motion measurements using RGB-D data and off-line dense three-dimensional reconstruction using sparse BA. Endres [F. Endres, J. Hess, J. Sturm, D. Cremers, and W. Burgard. 3-d mapping with an rgb-d camera. IEEE Transactions on Robotics, 30(1):177-187, 2014.] et al. proposed to estimate the camera pose by using visual features combined with depth information and represent a scene by using a three-dimensional probability occupancy grid. Kerl [C. Kerl, J. Sturm, and D. Cremers. Dense visual SLAM for RGB-D cameras. In 2013 IEEE/RSJ International Conference on Intelligent Robots and Systems, Tokyo, Japan, Nov. 3-7, 2013, pages 2100-2106, 2013] et al. proposed to directly minimize photometric errors and depth errors by using dense RGB-D data, so as to achieve camera pose estimation, and this method has a higher accuracy than the method based on sparse visual features. Newcombe [. R. A. Newcombe, S. Izadi, O. Hilliges, D. Molyneaux, D. Kim, A. J. Davison, P. Kohli, J. Shotton, S. Hodges, and A. W. Fitzgibbon. Kinectfusion: Real-time dense surface mapping and tracking. In 10th IEEE International Symposium on Mixed and Augmented Reality, ISMAR 2011, Basel, Switzerland, Oct. 26-29, 2011, pages 127-136, 2011] et al. proposed KinectFusion using voxel-based representations to reconstruct a three-dimensional model and aligning each frame to the model by ICP algorithm, and experiments show that it has good reconstruction quality at small scales. However, due to limitation of the GPU memory, KinectFusion is not suitable for a large-scale scene reconstruction. Moreover, KinectFusion can't handle drift problems and loop closures. Lots of efforts have been made to improve KinectFusion, and these efforts focus on large-scale scene reconstruction using more efficient data structures. For example, Kintinuous [T. Whelan, J. McDonald, M. Kaess, M. Fallon, H. Johannsson, and J. Leonard. Kintinuous: Spatially extended Kinect-Fusion. In RSS Workshop on RGB-D: Advanced Reasoning with Depth Cameras, Sydney, Australia, July 2012.] used a moving volume method to improve KinectFusion. Nießner [M. Nießner, M. Zollhöfer, S. Izadi, and M. Stamminger. Real-time 3d reconstruction at scale using spatial hashing. ACM Trans. Graph., 32(6):169: 1-169:11, 2013.] et al. proposed to use spatial hashing to store sparse voxel information. However, none of these methods solves the drift problem of camera pose estimation and model adjustments required for the loop closure.

The drift-free camera pose estimation and sparse reconstruction have been extensively studied in visual SLAM. Many monocular SLAM methods enable real-time camera tracking and sparse three-dimensional reconstruction in small scenes and even street-sized scenes. Some methods can also handle relocalization and loop closure. However, none of these methods can produce a dense three-dimensional model. Some methods that can reconstruct dense three-dimensional models in real time are mostly limited to small scenes or do not consider the drift-free three-dimensional dense reconstruction.

Some off-line methods can achieve drift-free, dense three-dimensional reconstruction through loop closure, however, its speed is far from real-time. Recently, Whelan [T. Whelan, M. Kaess, H. Johannsson, M. F. Fallon, J. J. Leonard, and J. McDonald. Real-time large-scale dense RGB-D SLAM with volumetric fusion. I. J. Robotics Res., 34(4-5):598-626, 2015.] et al. proposed that an RGB-D SLAM system based on voxel fusion can detect loop closure in large scenes, and model errors caused by camera drift can be corrected by model surface deformation that is as rigid as possible. ElasticFusion [T. Whelan, S. Leutenegger, R. F. Salas-Moreno, B. Glocker, and A. J. Davison. ElasticFusion: Dense SLAM without A pose graph. In Robotics: Science and Systems XI, Sapienza University of Rome, Rome, Italy, Jul. 13-17, 2015, 2015.] used a set of patches to represent three-dimensional model and also used the model transformation that as rigid as possible to correct the three-dimensional model when the loop is closed. These methods use frame-to-model alignment, and errors occurring during alignment will affect an accuracy of the model, and as a result, the inaccurate model will reduce the accuracy of camera tracking. Using surface deformation when the loop is closed cannot correct the model error, which may eventually lead to a tracking failure in complex scenes. BundleFusion [A. Dai, M. Nießner, M. Zollhöfer, S. Izadi, and C. Theobalt. BundleFusion: Real-time globally consistent 3d reconstruction using online surface reintegration. arXiv preprint arXiv:1604.01093, 2016.] used brute force matching for alignment of each frame, and re-integration was implemented when adjusting poses, thereby obtaining a globally consistent model. However, BundleFusion stores all input data and limits its operation on long sequence data. Moreover, even with a very strong GPU, using brute force matching for long sequence input is also very time consuming. The present disclosure can continuously adjust the camera pose and refuse the depth map by using a key frame-based representation and tracking framework. The internal memory consumption of the present disclosure is linear with data of the key frame, so in a large-scale scene, since the number of key frames is limited, it can run for infinite time.

SUMMARY

In view of the deficiencies of the above techniques, the present disclosure proposes a simultaneous localization and dense three-dimensional reconstruction method, which can reliably handle violent rotation and rapid motion, supports relocating and can construct and adjust a dense three-dimensional model in real time.

The simultaneous localization and dense three-dimensional reconstruction method in the present disclosure includes:

Step 1) of estimating an initial camera pose by an RGB-D alignment, and optimizing a camera pose using homography-based feature matching;

Step of 2) of running an "increment bundling adjustment" algorithm to adaptively update and optimize the camera pose of a key frame;

Step of 3) of fusing a non-key depth map to the key frame, reconstructing a three-dimensional model based on a depth map of the key frame, and updating the three-dimensional model by refusion when the camera pose changes.

The step of estimating the initial camera pose by the RGB-D alignment and optimizing the camera pose using homography-based feature matching includes following steps.

For each current frame $F_i$, a relative pose $T_{(i-1) \to i}$ of a camera is estimated from a previous frame to the current frame by using the RGB-D alignment. Only a rough estimation is required here, so the relative pose of the two frames is estimated by using a small blurry image (SBI) to achieve a real-time operation on a CPU. The methods listed in the references are optional methods available.

An accurate camera pose is obtained by feature matching. To handle violent rotation and rapid motion, the present disclosure obtains the camera pose by using a homography-based feature matching method. Under violent rotation and rapid motion, a perspective distortion between two frames can be so large that the feature-based matching cannot work robustly. The perspective distortion of an image block can be corrected by using Homography, thereby making a zero-mean SSD feasible. A relatively small search area $x_i^{homo}$ can be determined by using Homography, thereby avoiding searching along an entire epipolar line. In the present disclosure, since there are the depth information $z_k$ and the camera pose estimation $C_i = T_{(i-1) \to i} C_{i-1}$ using the RGB-D alignment, the search area is set to $x_i^{homo}$ and $X_i^{RGB-D} = \pi(C_i C_k^{-1}(z_k K^{-1} \tilde{x}_k))$.

After the relative pose $T_{(i-1) \to i}$ and a 3D-2D feature matching set $\chi = \{(X_j, x_j)\}$ are determined, the camera pose $C_i$ is estimated by minimizing a relative error and a reprojection error:

$$C_i^* = \underset{C_i}{\arg\min} \|\log(C_i C_{i-1}^{-1} T_{(i-1) \to i}^{-1})\|_{\Sigma_T}^2 + \sum_{(X_j, x_j) \in \chi} \left( \|\pi(K(C_i X_j)) - x_j\|_{\delta_x} + \|z(C_i X_j) - z_j\|_{\delta_z} \right)$$

Here, log(T) maps a 3D rigid transformation $T \in SE(3)$ to se(3) and returns a vector representation in $R^6$. $\|\epsilon\|_\Sigma^2 = \epsilon^T \Sigma^{-1} \epsilon$ is standard Mahalanobis distance.

$$\pi([x, y, z]^T) = \left[\frac{x}{z}, \frac{y}{z}\right]$$

is projection function. K is a known and constant camera intrinsics. z(X) is used for extracting a z component from X. $z_j$ is a depth of $x_j$ at the current frame. $\|\epsilon\|_\delta$ is Huber norm:

$$\|\epsilon\|_\delta = \begin{cases} \|\epsilon\|_2^2; & \text{if } \|\epsilon\|_2 \le \delta \\ \|\epsilon\|_1 - \frac{\delta}{2}; & \text{Otherwise} \end{cases}$$

If the tracking fails, then the feature are re-tracked, otherwise, the depth of the feature is filtered by using a Bayesian method based on depth information of a new feature. For each pair of feature matching $(x_i, x_j)$ of the key frame $F_k$ and the current frame $F_i$, a reciprocal $\rho_k$ of an $x_k$ depth is obtained:

$$\rho_{i \to k} = \min_\rho \frac{1}{\delta_x^2} \|\pi(K(C_i \pi^{-1}(C_k, x_k, \rho^{-1}))) - x_i\|_2^2 + \frac{1}{\delta_z^2} (z(C_i \pi^{-1}(C_k, x_k, \rho^{-1})) - z_i)^2$$

Here, $\pi^{-1}(C, x, z) = C^{-1}(zK^{-1}\tilde{x})$. Through $\rho_{i \to k}$, the filter continuously updates a joint distribution of $\rho_k$ and its inlier points.

Finally, when each new frame arrives, the present disclosure determines whether to select it as a key frame.

Running an "increment bundling adjustment" algorithm to adaptively update and optimize the camera pose of a key frame includes following steps.

When a new key frame is added or a closed loop is detected, the BA needs to be run. In the former case, it is not necessary to run the global BA because there is only local map adjustment. However, running only local BA tends to generate suboptimal solutions, especially when there is a relatively large deviation in the local map. Therefore, more variables need to be introduced in the BA, otherwise errors cannot be completely eliminated. The incremental BA proposed by the present disclosure can obtain a solution close to that of the global BA, and runtime is linearly related to the number of the variables changed in the BA, making it possible to significantly reduce the runtime. The specific method is as follows:

defining current camera motion parameter as $C = \{C_1, C_2, \ldots, C_{n_c}\}$, $C_i \in SE(3)$, where $n_c$ is the number of the cameras, defining current three-dimensional point position as $\chi=\{X_1, X_2, \ldots X_{n_p}\}, X_j \in R^3$, where $n_p$ is the number of three-dimensional points, defining the set of three-dimensional points visible to the camera i as $V_i^c$, defining the set of cameras visible to the three-dimensional point j as $V_j^p$, and iterating and optimizing with Gauss-Newton algorithm:

$$\underset{C,\chi}{\operatorname{argmin}} \sum_i \sum_{j \in V_i^c} \|e(C_i, X_j)\|_2^2$$

for each iteration, defining the current camera motion parameter as $\hat{C}=\{\hat{C}_1, \ldots, \hat{C}_{n_c}\}$, defining the current three-dimensional point position as $\hat{X}=\{\hat{X}_1, \ldots, \hat{X}_{n_p}\}$, defining the increment of the camera motion parameter as $\tilde{c}=[\tilde{c}_1^T, \ldots, \tilde{c}_{n_c}^T]^T$, $\tilde{c}_i \in R^6$, and defining the increment of the three-dimensional point position as $\tilde{x}=[\tilde{x}_1^T, \ldots, \tilde{x}_{n_c}^T]$, $\tilde{x}_j \in R^3$, and linearly expanding $e(C_i, X_j)$ at $(\hat{C}_i, \hat{X}_j)$:

$$e(\hat{C}_i \oplus \tilde{c}_i, \hat{X}_j + \tilde{x}_j) \approx \hat{e}_{ij} + \hat{J}_{ij}^c \tilde{c}_i + \hat{J}_{ij}^p \tilde{x}_j$$

where $\hat{C} \oplus \tilde{c}$ denotes that a se(3) increment corresponding to $\tilde{c}$ is superimposed on $\hat{C} \in SE(3)$, and a normal equation is defined as:

$$\begin{bmatrix} U & W \\ W^T & V \end{bmatrix} \begin{bmatrix} \tilde{c} \\ \tilde{x} \end{bmatrix} = \begin{bmatrix} u \\ v \end{bmatrix}$$

U and V are diagonal matrix blocks of $n_c \times n_c$, $n_p \times n_p$, respectively:

$$U = \operatorname{diag}(U_1, \ldots, U_{n_c})$$

$$V = \operatorname{diag}(V_1, \ldots, V_{n_p})$$

for each submatrix $U_i \in R^{6 \times 6}$, $V_j \in R^{3 \times 3}$, W is a block matrix of $n_c \times n_p$:

$$W = \begin{bmatrix} W_{11} & \cdots & W_{1n_p} \\ \vdots & \ddots & \vdots \\ W_{n_c 1} & \cdots & W_{n_c n_p} \end{bmatrix}$$

for each submatrix $W_{ij} \in R^{6 \times 3}$ a right-side vector of the normal equation is:

$$u = [u_1^T, \ldots, u_{n_c}^T]^T$$

$$v = [v_1^T, \ldots, v_{n_p}^T]^T$$

for each subvector $u_i \in R^6$, $v_j \in R^3$, defining a Schur complement equation:

$$S\tilde{c} = g$$

where, $$S = U - WV^{-1}W^T$$

$$g = u - WV^{-1}v$$

S is a block matrix of $n_c \times n_c$:

$$S = \begin{bmatrix} S_{11} & \cdots & S_{1n_c} \\ \vdots & \ddots & \vdots \\ S_{n_c 1} & \cdots & S_{n_c n_c} \end{bmatrix}$$

for each submatrix $S_{ij} \in R^{6 \times 6}$ a right-side vector of the Schur complement equation is:

$$g = [g_1^T, \ldots, g_{n_c}^T]^T$$

for each sub-vector $g_i \in R^6$, defining auxiliary vectors $A_{ij}^U \in R^{6 \times 6}$, $A_{ij}^V \in R^{6 \times 3}$, $b_{ij}^u \in R^6$, $b_{ij}^v \in R^3$, where $i=1, \ldots, n_c$, $j \in V_i^c$, and defining auxiliary variables $A_{i_1 i_2 j}^S \in R^{6 \times 6}$, $b_{ij}^g \in R^6$, where $j=1, \ldots, n_p$, $(i_1, i_2) \in V_j^p \times V_j^p$. At an initial moment, let $U=0$, $V=0$, $W=0$, $u=0$, $v=0$, $S=0$, $g=0$, $A_{ij}^U=0$, $A_{ij}^V=0$, $b_{ij}^u=0$, $b_{ij}^v=0$, $A_{i_1 i_2 j}^S=0$, $b_{ij}^g=0$, and following steps are run for each iteration:

a) for each three-dimensional point j and its visible camera $i \in V_j^p$, if $\hat{C}_i$ or $\hat{X}_j$ is updated in the previous iteration, then $\hat{J}_{ij}^c$, $\hat{J}_{ij}^p$, and $\hat{e}_{ij}$ at $\hat{C}_i$ and $\hat{X}_j$ are calculated, and respective variables are updated by following formulas:

$$S_{ii} -= A_{ij}^U; A_{ij}^U = (\hat{J}_{ij}^c)^T \hat{J}_{ij}^c; S_{ii} += A_{ij}^U$$

$$V_j -= A_{ij}^V; A_{ij}^V = (\hat{J}_{ij}^p)^T \hat{J}_{ij}^p; V_j += A_{ij}^V$$

$$g_i -= b_{ij}^u; b_{ij}^u = -(\hat{J}_{ij}^c)^T \hat{e}_{ij}; g_i += b_{ij}^u$$

$$v_j -= b_{ij}^v; b_{ij}^v = -(\hat{J}_{ij}^p)^T \hat{e}_{ij}; v_j += b_{ij}^v$$

$$W_{ij} = (\hat{J}_{ij}^c)^T \hat{J}_{ij}^p$$

f) for each three-dimensional point j, if $V_j$ is updated in the current iteration, then for the camera $i \in V_j^p$ visible to each three-dimensional point j, respective variables are updated by following formulas:

$$g_i += b_{ij}^g$$

$$Y_{ij} = W_{ij} V_j^{-1}$$

$$b_{ij}^g = Y_{ij} v_j$$

$$g_i -= b_{ij}^g$$

for a pair of cameras $(i_1, i_2) \in V_j^p \times V_j^p$ visible to the three-dimensional point j, respective variables are updated by following formulas:

$$S_{i_1 i_1} += A_{i_1 i_1 j}^S; A_{i_1 i_1 j}^S = Y_{i_1 j} W_{i_1 j}^T; S_{i_1 i_1} -= A_{i_1 i_1 j}^S$$

$$S_{i_1 i_2} += A_{i_1 i_2 j}^S; A_{i_1 i_2 j}^S = Y_{i_1 j} W_{i_2 j}^T; S_{i_1 i_2} -= A_{i_1 i_2 j}^S$$

$$S_{i_2 i_2} += A_{i_2 i_2 j}^S; A_{i_2 i_2 j}^S = Y_{i_2 j} W_{i_2 j}^T; S_{i_2 i_2} -= A_{i_2 i_2 j}^S$$

g) the above Schur complement equation is solved by using a preconditioned conjugate gradient algorithm, so as to obtain a camera increment $\tilde{c}$, and for each camera i, if $|\tilde{c}_i| > \epsilon_c$, then $\hat{C}_i$ is updated with $\tilde{C}_i \oplus \tilde{c}_i$.

b) for each three-dimensional point j, if $V_j$ is updated in the current iteration, or if $\hat{C}_{i_i}$ in the camera $i \in V_j^p$ is updated in the current iteration, then $$\tilde{x}_j = V_j^{-1}\left(v_j - \sum_{i \in V_j^p} W_{ij}^T \tilde{c}_v\right)$$

is calculated, and if $|\tilde{x}_j| > \epsilon_p$, then $\hat{X}_j$ is updated with $\hat{X}_j + \tilde{x}_j$.

c) If no camera or three-dimensional point is updated in the current iteration, or the maximum number of iterations is reached, then the loop ends, otherwise, the step a) is repeated.

The present disclosure uses a voxel-based three-dimensional model representation, and each voxel records its truncated signed nearest surface distance (TSDF). In order to improve GPU memory usage and reconstructed scene scales, a spatial hashing method is used.

When the camera pose is adjusted, the reconstructed three-dimensional model needs to be adjusted correspondingly. A simple method is to store all the depth maps and refuse them into the three-dimensional model when adjusting the camera pose corresponding to a respective depth map. However, this method has disadvantages of high memory consumption and large computation complexity. To this end, the present disclosure proposes a key frame-based depth map representation and fusion and reverse-fusion method, which effectively solves this problem. Specifically:

If the current frame $F_i$ is selected as a key frame, then its corresponding depth map $D_i$ is directly fused onto the model. For each voxel v, its truncated signed nearest surface distance (TSDF) is represented by D(v), and a weight is represented by W(v). For each pixel x in $F_i$, its corresponding voxel v is updated by a following method:

$$D'(v) = \frac{D(v)W(v) + w_i(x)D_i(x)}{W(v) + w_i(x)}, \quad W'(v) = W(v) + w_i(x)$$

where $w_i(x)$ is a fusion weight of the pixel x.

If the current frame $F_i$ is not selected as a key frame, then a key frame that best matches $F_i$ is searched first and denoted as $F_{K_i}$. First, the depth map corresponding to the key frame $F_{K_i}$ is reversely fused. The reverse-fusion process is similar to the fusion process. For each pixel x, its corresponding voxel v is updated by a following method:

$$D'(v) = \frac{D(v)W(v) - w_i(x)D_i(x)}{W(v) - w_i(x)}, \quad W'(v) = W(v) - w_i(x)$$

where $w_i(x)$ is a fusion weight of the pixel x.

Subsequently, the depth map $D_i$ is fused to $F_{K_i}$ by projecting it onto $F_{K_i}$. For each pixel x of $F_i$, a coordinate of its projection to $F_{K_i}$ is represented by y. If a reciprocal $$(1/D_{F_{K_i}}(y))$$

of a depth corresponding to y and a reciprocal (represented by $1/z_x^{i \to K_i}$) of a depth of a projection point of x are smaller than a threshold $\tau_d$ (in the present disclosure, it is set to 0.1), then the depth of y is updated to be:

$$D'(y) = w_{K_i}(y)D_{K_i}(y) + w_i(x)z_x^{i \to K_i}$$

$$w_{K_i} = w_{K_i}(y) + w_i(x)$$

For each key frame $F_{K_i}$, the number $N_{K_i}$ of times it is fused is recorded, and when $N_{K_i}$ is larger than a certain threshold, the fusion ends. Since an overlapping of viewing angles of $F_i$ and $F_{K_i}$ is relatively large, most of the depths of the current frame can be fused to $F_{K_i}$, except for some points outside the viewing angle of $F_{K_i}$. Therefore, this fusion strategy can effectively reduce a depth redundancy. If the number of residual depth points after the current frame is fused is less than $\tau$ (for example, 2000), these points are discarded. Otherwise, a point cloud set $V_i$ is created to store the unfused three-dimensional points and associate them to $F_{K_i}$. After that, the updated depth map $F_{K_i}$ of the key frame is fused to the model. If $V_i$ is not empty, the three-dimensional points in $V_i$ are projected to $F_{K_i}$ and fused to the model. Therefore, for each non-key frame, two fusions and one reverse fusion will be performed. Since the number of unfused points is relatively small, the fusion time required is relatively less. Therefore, computation complexity of the present disclosure is substantially slightly greater than twice of that of a conventional fusion method. If $N_{K_i}$ is relatively large and the number of the key frames no longer increases, it means that the RGB-D camera does not scan for new information, in which case $D_i$ is simply discarded.

To further reduce the redundancy of the depth data, if the current frame $F_i$ is selected as the key frame, then several point cloud sets associated to an adjacent key frame are selected and fused to the current frame. If the number of the points remaining in $V_i$ after fusion is less than $\tau$ (for example, 2000), they will be reversely fused and discarded from the model. Otherwise, the points fused to the current frame are reversely fused from the model.

When the pose of the key frame is adjusted by BA, it is necessary to refuse the depth map corresponding to the key frame and the point cloud set associated therewith. However, if the number of the key frames to be adjusted is relatively large, refusion will take a lot of time, making it impossible to meet the requirements of real-time. Thus, the present disclosure limits the number of the times of refusion for each frame and distributes all refusions to each frame. In particular, the depth map corresponding to the key frame with a relatively large change in pose and the point cloud set associated therewith will be refused first. This strategy can ensure that the reconstruction portion runs at a constant speed when the BA occurs.

In order to further speed up, one frame can be fused into the model every two frames or more. This method can greatly speed up the fusion process and can be run in real time on a laptop.

DESCRIPTION OF EMBODIMENTS

Figure 1:
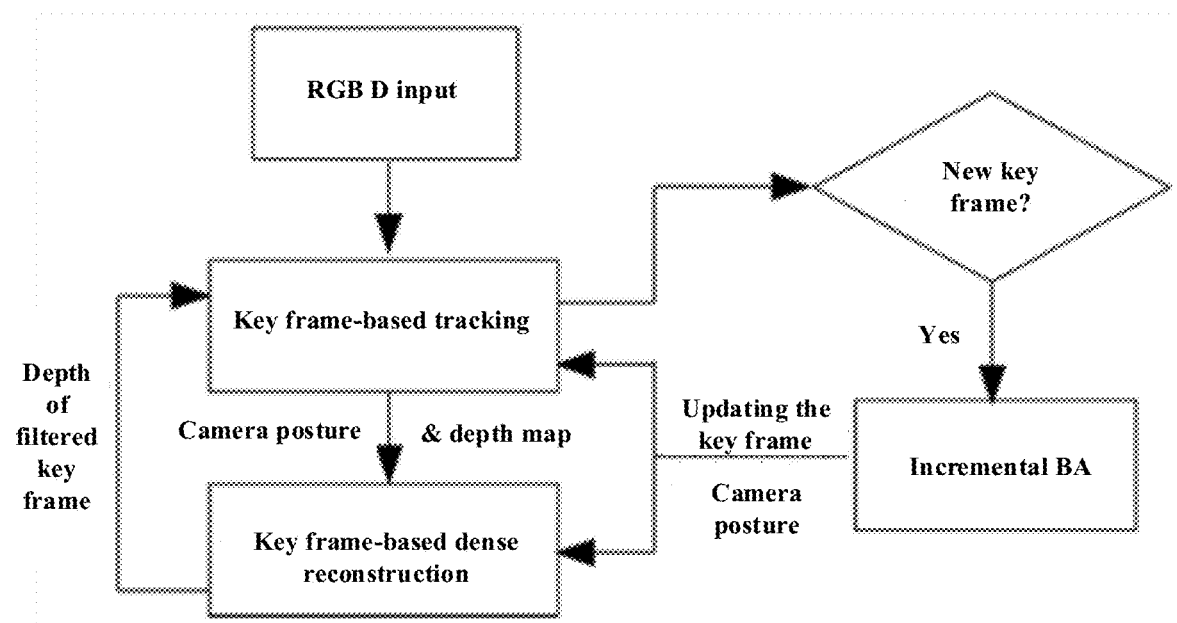
FIG. 1 is a system framework of the present disclosure.

A system architecture of the present disclosure is shown in FIG. 1. A camera tracking portion and a three-dimensional model reconstruction portion of the system run in parallel. For each input frame that contains an RGB image and a depth map, the camera tracking portion first calculates a camera pose by combining an RGB-D alignment and homography-based feature tracking method, so that robust camera tracking is achieved. Meanwhile, ORB features of key frames are extracted and matched so as to detect a global loop closure. Finally, an incremental BA is periodically run in a background to optimize the camera pose. The reconstruction module fuses an input depth onto the depth map of the key frame at the time when tracking the camera pose by the input frame is reliable. In order to online adjust a dense three-dimensional surface, the system will perform reverse fusion and refusion on the key frame. This strategy allows that only the depths of the key frames and some extra point clouds need to be refused when adjusting the camera pose.

Since the number of the key frames is limited in a large-scale scene, the present system can run for infinite time.

Figure 2:
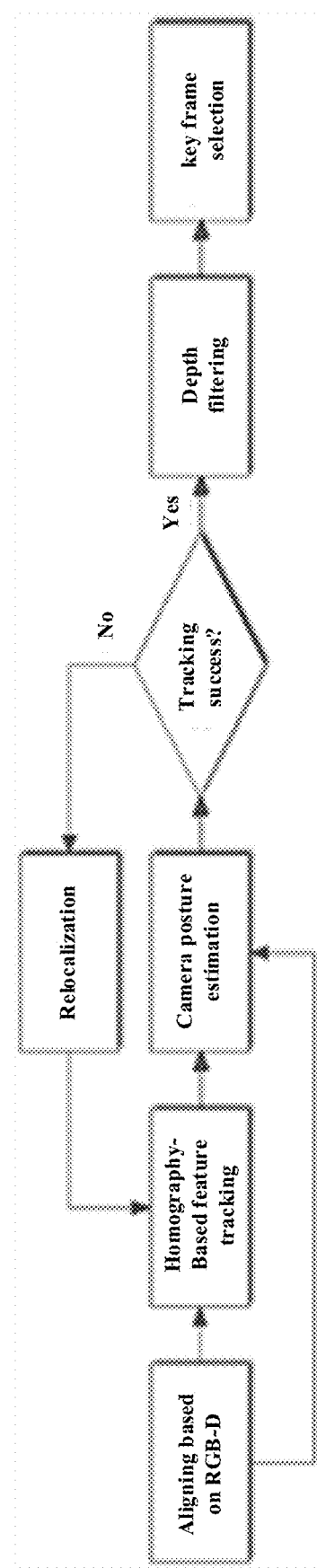
FIG. 2 is a key frame-based camera tracking framework of the present disclosure.
Figure 3:
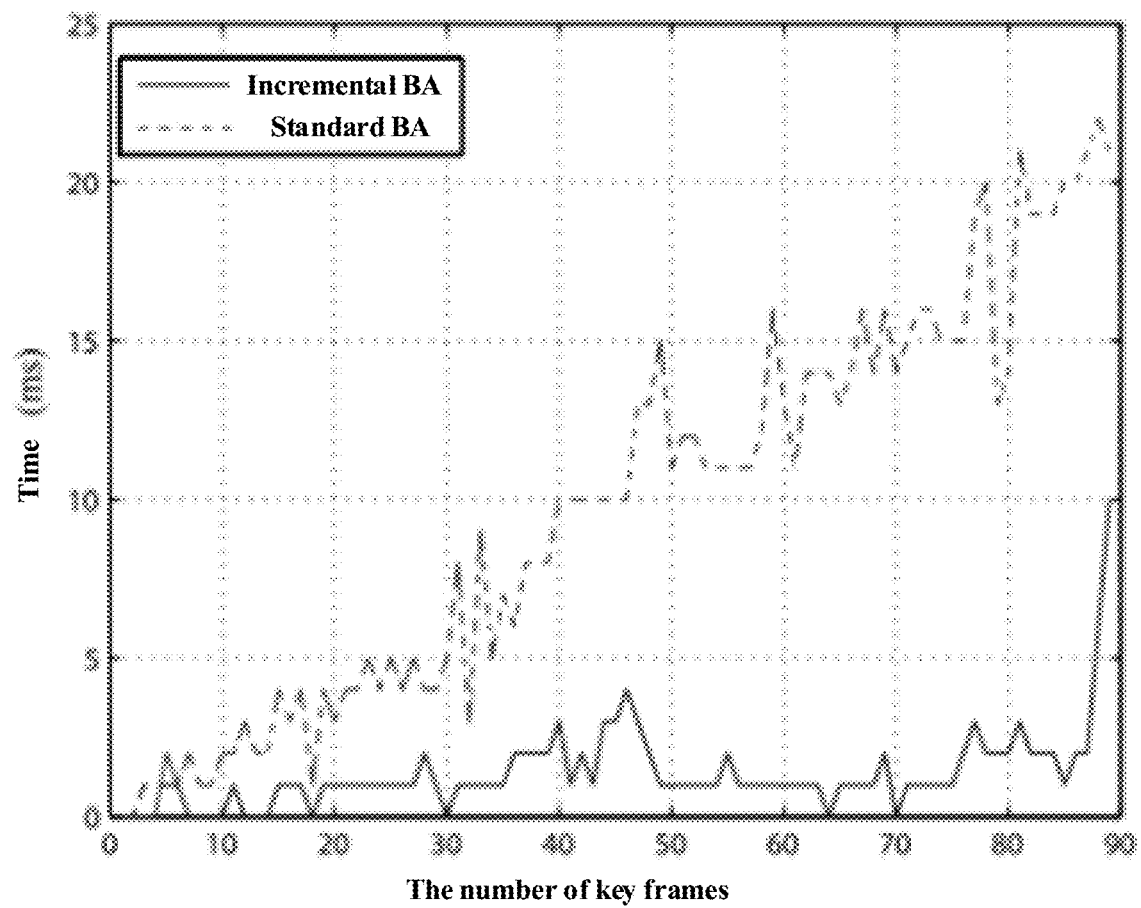
FIG. 3 illustrates a comparison of performances of an incremental BA proposed by the present disclosure and a standard BA, showing that the present disclosure can greatly speed up a BA speed while maintaining considerable accuracy with respect to the standard BA.

The present disclosure simultaneously combines image intensity and depth information to track a camera motion, and combining dense RGB-D based and sparse feature based methods makes camera tracking more accurate and robust. The basic framework is shown in FIG. 2. For each current frame $F_i$, the RGB-D alignment [C. Kerl, J. Sturm, and D. Cremers. Dense visual SLAM for RGB-D cameras. In 2013 IEEE/RSJ International Conference on Intelligent Robots and Systems, Tokyo, Japan, Nov. 3-7, 2013, pages 2100-2106, 2013.] is used first to estimate a relative pose $T_{(i-1)\to i}$ of a camera from a previous frame to a current frame. Only a rough estimation is required here, so the relative pose of the two frames is estimated by using a small blurry image (SBI) [G. Klein and D. W. Murray. Improving the agility of key frame-based SLAM. In 10th European Conference on Computer Vision, Part II, pages 802-815. Springer, 2008.], thereby achieving real-time running on a CPU.

An accurate camera pose is obtained by feature matching. To handle violent rotation and rapid motion, the present disclosure obtains the camera pose by using a homography-based [H. Liu, G. Zhang, and H. Bao. Robust key frame-based monocular SLAM for augmented reality. In IEEE International Symposium on Mixed and Augmented Reality, ISMAR 2016.] feature matching method. Under violent rotation and rapid motion, a perspective distortion between two frames can be so large that the feature-based matching cannot work robustly. the perspective distortion of an image block can be corrected by using Homography, thereby making a zero-mean SSD [G. Klein and D. W. Murray. Parallel tracking and mapping for small AR workspaces. In 6th IEEE/ACM International Symposium on Mixed and Augmented Reality, pages 225-234, 2007.] feasible. A relatively small search area $x_i^{homo}$ can be determined by using Homography, thereby avoiding searching along an entire epipolar line. In the present disclosure, since there are the depth information $z_k$ and the camera pose estimation $C_i = T_{(i-1)\to i} C_{i-1}$ using the RGB-D alignment, the search area is set to be $x_i^{homo}$ and $X_i^{RGB-D} = \pi(K(C_i C_k^{-1}(z_k K^{-1} \tilde{x}_k)))$.

After the relative pose $T_{(i-1)\to i}$ and a 3D-2D feature matching set $\chi = \{(X_j, x_j)\}$ are determined, the camera pose $C_i$ is estimated by minimizing a relative error and a reprojection error:

$$C_i^* = \underset{C_i}{\operatorname{argmin}} \|\log(C_1 C_{i-1}^{-1} T_{(i-1)\to i}^{-1})\|_{\Sigma_T}^2 +$$

$$\sum_{(X_j, x_j) \in \chi} \left( \|\pi(K(C_i X_j)) - x_j\|_{\delta_x} + \|z(C_i X_j) - z_j\|_{\delta_z} \right)$$

Here, log(T) maps a 3D rigid transformation $T \in SE(3)$ to $se(3)$ and returns a vector representation in $R^6$. $\|\epsilon\|_\Sigma^2 = \epsilon^T \Sigma^{-1} \epsilon$ is a standard Mahalanobis distance.

$$\pi([x, y, z]^T) = \left[ \frac{x}{z}, \frac{y}{z} \right]$$

is a projection function. K is a known and constant camera intrinsics. z(X) is used for extracting a z component from X. $z_j$ is a depth of $x_j$ at the current frame. $\|\epsilon\|_\delta$ is a Huber norm:

$$\|\epsilon\|_\delta = \begin{cases} \|\epsilon\|_2^2; & \text{if } \|\epsilon\|_2 \le \delta \\ \|\epsilon\|_1 - \frac{\delta}{2}; & \text{Otherwise} \end{cases}$$

If the tracking fails, then the feature is re-tracked using the method described in [G. Klein and D. W. Murray. Improving the agility of key frame-based SLAM. In 10th European Conference on Computer Vision, Part II, pages 802-815. Springer, 2008.]. Otherwise, the depth of the feature is filtered by using a Bayesian method [G. Vogiatzis and C. Hernández. Video-based, real-time multi-view stereo. Image Vision Comput., 29(7):434-441, 2011.] based on the depth information of the new feature. For each pair of the feature matching $(x_i, x_j)$ of the key frame $F_k$ and the current frame $F_i$, a reciprocal $\rho_k$ of the $x_k$ depth is obtained:

$$\rho_{i \to k} = \min_{\rho} \frac{1}{\delta_x^2} \|\pi(K(C_i \pi^{-1}(C_k, x_k, \rho^{-1}))) - x_i\|_2^2 + \frac{1}{\delta_z^2} (z(C_i \pi^{-1}(C_k, x_k, \rho^{-1})) - z_i)^2$$

Here, $\pi^{-1}(C, x, z) = C^{-1}(zK^{-1}\tilde{x})$. Through $\rho_{i \to k}$, the filter continuously updates a joint distribution of $\rho_k$ and its inlier points.

Finally, when each new frame arrives, the present disclosure determines whether to select it as a key frame.

When a new key frame is added or a closed loop is detected, the BA needs to be run. In the former case, it is not necessary to run the global BA because there is only local map adjustment. However, running only local BA tends to generate suboptimal solutions, especially when there is a relatively large deviation in the local map. Therefore, more variables need to be introduced in the BA, otherwise the errors cannot be completely eliminated. The incremental BA proposed by the present disclosure can obtain a solution close to that of the global BA, and runtime is linearly related to the number of the variables changed in the BA, making it possible to significantly reduce the runtime. The specific method is as follows:

defining a current camera motion parameter as $C = \{C_1, C_2, \ldots, C_{n_c}\}$, $C_i \in SE(3)$, with $n_c$ being the number of the cameras, defining a current three-dimensional point position as $\chi = \{X_1, X_2, \ldots X_{n_p}\}$, $X_j \in R^3$, with $n_p$ being the number of the three-dimensional points, defining a set of the three-dimensional points visible to the camera i as $V_i^c$, defining a set of the cameras visible to the three-dimensional point j as $V_j^p$, and iterating and optimizing with the Gauss-Newton algorithm:

$$\underset{C, \chi}{\operatorname{argmin}} \sum_i \sum_{j \in V_i^c} \|e(C_i, X_j)\|_2^2$$

for each iteration, defining the current camera motion parameter as $\hat{C} = \{\hat{C}_1, \ldots, \hat{C}_{n_c}\}$, defining the current three-dimensional point position as $\hat{X} = \{\hat{X}_1, \ldots, \hat{X}_{n_p}\}$, defining an increment of the camera motion parameter as $\tilde{c} = [\tilde{c}_1^T, \ldots, \tilde{c}_{n_c}^T]^T$, $\tilde{c}_i \in R^6$, and defining an increment of the three-dimensional point position as $\tilde{x} = [\tilde{x}_1^T, \ldots, \tilde{x}_{n_c}^T]$, $\tilde{x}_j \in R^3$, and linearly expanding $e(C_i, X_j)$ at $(\hat{C}_i, \hat{X}_j)$:

$$e(\hat{C}_i \oplus \tilde{c}_i, \hat{X}_j + \tilde{x}_j) \approx \tilde{e}_{ij} + \hat{j}_{ij}^c \tilde{c}_i + \hat{j}_{ij}^p \tilde{x}_j$$

where $\hat{C} \oplus \tilde{c}$ denotes that a se(3) increment corresponding to $\tilde{c}$ is superimposed on $\hat{C} \in SE(3)$, and a normal equation is defined as:

$$\begin{bmatrix} U & W \\ W^T & V \end{bmatrix} \begin{bmatrix} \tilde{c} \\ \tilde{x} \end{bmatrix} = \begin{bmatrix} u \\ v \end{bmatrix}$$

U and V are diagonal matrix blocks of $n_c \times n_c$, $n_p \times n_p$, respectively:

$$U = \mathrm{diag}(U_1, \ldots, U_{n_c})$$

$$V = \mathrm{diag}(V_1, \ldots, V_{n_p})$$

for each submatrix $U_i \in R^{6 \times 6}$, $V_j \in R^{3 \times 3}$, W is a block matrix of $n_c \times n_p$:

$$W = \begin{bmatrix} W_{11} & \cdots & W_{1n_p} \\ \vdots & \ddots & \vdots \\ W_{n_c 1} & \cdots & W_{n_c n_p} \end{bmatrix}$$

for each submatrix $W_{ij} \in R^{6 \times 3}$ a right-side vector of the normal equation is:

$$u = [u_1^T, \ldots, u_{n_c}^T]^T$$

$$v = [v_1^T, \ldots, v_{n_p}^T]^T$$

for each subvector $u_i \in R^6$, $v_j \in R^3$, defining a Schur complement equation:

$$S\tilde{c} = g$$

where, $$S = U - WV^{-1}W^T$$

$$g = u - WV^{-1}v$$

S is a block matrix of $n_c \times n_c$:

$$S = \begin{bmatrix} S_{11} & \cdots & S_{1n_c} \\ \vdots & \ddots & \vdots \\ S_{n_c 1} & \cdots & S_{n_c n_c} \end{bmatrix}$$

for each submatrix $S_{ij} \in R^{6 \times 6}$ a right-side vector of the Schur complement equation is:

$$g = [g_1^T, \ldots, g_{n_c}^T]^T$$

for each sub-vector $g_i \in R^6$, defining auxiliary vectors $A_{ij}^U \in R^{6 \times 6}$, $A_{ij}^V \in R^{3 \times 3}$, $b_{ij}^u \in R^6$, $b_{ij}^v \in R^3$, where $i=1, \ldots, n_c$, $j \in V_i^c$, and defining auxiliary variables $A_{i_1 i_2 j}^S \in R^{6 \times 6}$, $b_{ij}^g \in R^6$, where $j=1, \ldots, n_p$, $(i_1, i_2) \in V_j^p \times V_j^p$. At an initial moment, let $U=0$, $V=0$, $W=0$, $u=0$, $v=0$, $S=0$, $g=0$, $A_{ij}^U=0$, $A_{ij}^V=0$, $b_{ij}^u=0$, $b_{ij}^v=0$, $A_{i_1 i_2 j}^S=0$, $b_{ij}^g=0$, and following steps are run for each iteration:

a) for each three-dimensional point j and its visible camera $i \in V_j^p$, if $\hat{C}_i$ or $\hat{X}_j$ is updated in the previous iteration, then $\hat{J}_{ij}^c$, $\hat{J}_{ij}^p$, and $\hat{e}_{ij}$ at $\hat{C}_i$ and $\hat{X}_j$ are calculated, and respective variables are updated by following formulas:

$$S_{ii} -= A_{ij}^U A_{ij}^U = (\hat{J}_{ij}^c)^T \hat{J}_{ij}^c S_{ii} += A_{ij}^U$$

$$V_j -= A_{ij}^V A_{ij}^V = (\hat{J}_{ij}^p)^T \hat{J}_{ij}^p V_j += A_{ij}^V$$

$$g_i -= b_{ij}^u b_{ij}^u = -(\hat{J}_{ij}^c)^T \hat{e}_{ij} g_i += b_{ij}^u$$

$$v_j -= b_{ij}^v b_{ij}^v = -(\hat{J}_{ij}^p)^T \hat{e}_{ij} v_j += b_{ij}^v$$

$$W_{ij} = (\hat{J}_{ij}^c)^T \hat{J}_{ij}^p$$

h) for each three-dimensional point j, if $V_j$ is updated in the current iteration, then for the camera $i \in V_j^p$ visible to each three-dimensional point j, respective variables are updated by following formulas:

$$g_i += b_{ij}^q$$

$$Y_{ij} = W_{ij} V_j^{-1}$$

$$b_{ij}^g = Y_{ij} v_j$$

$$g -= b_{ij}^g$$

for a pair of cameras $(i_1, i_2) \in V_j^p \times V_j^p$ visible to the three-dimensional point j, respective variables are updated by following formulas:

$$S_{i_1 i_1} += A_{i_1 i_1 j}^S A_{i_1 i_1 j}^S = Y_{i_1 j} W_{i_2 j}^T S_{i_1 i_1} -= A_{i_1 i_1 j}^S$$

$$S_{i_1 i_2} += A_{i_1 i_2 j}^S A_{i_1 i_2 j}^S = Y_{i_1 j} W_{i_2 j}^T S_{i_1 i_2} -= A_{i_1 i_2 j}^S$$

$$S_{i_2 i_2} += A_{i_2 i_2 j}^S A_{i_2 i_2 j}^S = Y_{i_2 j} W_{i_2 j}^T S_{i_2 i_2} -= A_{i_2 i_2 j}^S$$

i) the above Schur complement equation is solved by using a preconditioned conjugate gradient algorithm, so as to obtain the camera increment $\tilde{c}$, and for each camera i, if $|\tilde{c}_i| > \epsilon_c$, then $\hat{C}_i$ is updated with $\hat{C}_i \oplus \tilde{c}_i$.

b) for each three-dimensional point j, if $V_j$ is updated in the current iteration, or if $\hat{C}_i$, in the camera $i \in V_j^p$ is updated in the current iteration, then $$\tilde{x}_j = V_j^{-1}\left(v_j - \sum_{i \in V_j^p} W_{ij}^T \tilde{c}_v\right)$$

is calculated, and if $|\tilde{x}_j| > \epsilon_p$, then $\hat{X}_j$ is updated with $\hat{X}_j + \tilde{x}_j$.

c) if no camera or three-dimensional point is updated in the current iteration, or the number of iterations reaches a maximum number, then the loop ends, otherwise, the step a is repeated).

Same as KinectFusion, the present disclosure uses a voxel-based three-dimensional model representations, and each voxel records its truncated signed nearest surface distance (TSDF). In order to improve GPU memory usage and reconstructed scene scales, a spatial hashing method proposed by Nießner [M. Nießner, M. Zollhöfer, S. Izadi, and M. Stamminger. Real-time 3d reconstruction at scale using voxel hashing. ACM Trans. Graph., 32(6):169:1-169: 11, 2013.] et al. is used.

When the camera pose is adjusted, the reconstructed three-dimensional model needs to be adjusted correspondingly. A simple method is to store all the depth maps and refuse them into the three-dimensional model when adjusting the camera pose corresponding to a respective depth map. However, this method has disadvantages of high memory consumption and large computation complexity. To this end, the present disclosure proposes a key frame-based depth map representation and fusion and reverse-fusion method, which effectively solves this problem. Specifically:

If the current frame $F_i$ is selected as a key frame, then its corresponding depth map $D_i$ is directly fused onto the model. For each voxel v, its truncated signed nearest surface distance (TSDF) is represented by $D(v)$, and a weight is represented by $W(v)$. For each pixel x in $F_i$, its corresponding voxel v is updated by a following method:

$$D'(v) = \frac{D(v)W(v) + w_i(x)D_i(x)}{W(v) + w_i(x)}, \quad W'(v) = W(v) + w_i(x)$$

where $w_i(x)$ is a fusion weight of the pixel x.

If the current frame $F_i$ is not selected as a key frame, then a key frame that best matches $F_i$ is searched first and represented as $F_{K_i}$. First, the depth map corresponding to the key frame $F_{K_i}$ is reversely fused. The reverse-fusion process is similar to the fusion process. For each pixel x, its corresponding voxel v is updated by a following method:

$$D'(v) = \frac{D(v)W(v) - w_i(x)D_i(x)}{W(v) - w_i(x)}, \quad W'(v) = W(v) - w_i(x)$$

where $w_i(x)$ is a fusion weight of the pixel x.

Subsequently, the depth map $D_i$ is fused to $F_{K_i}$ by being projected onto $F_{K_i}$. For each pixel x of $F_i$, a coordinate of its projection to $F_{K_i}$ is represented by y. If a reciprocal $$(1/D_{F_{K_i}}(y))$$

of a depth corresponding to y and a reciprocal (represented by $1/z_x^{i \to K_i}$) of a depth of a projection point of x are smaller than a threshold $\tau_d$ (in the present disclosure, it is set to 0.1), then the depth of y is updated to:

$$D'(y) = w_{K_i}(y)D_{K_i}(y) + w_i(x)z_x^{i \to K_i}$$

$$w_{K_i} = w_{K_i}(y) + w_i(x)$$

For each key frame $F_{K_i}$, the number $N_{K_i}$ of times it is fused is recorded, and when $N_{K_i}$ is larger than a certain threshold, the fusion ends. Since an overlapping of viewing angles of $F_i$ and $F_{K_i}$ is relatively large, most of the depths of the current frame can be fused to $F_{K_i}$, except for some points outside the viewing angle of $F_{K_i}$. Therefore, this fusion strategy can effectively reduce a depth redundancy. If the number of residual depth points after the current frame is fused is less than $\tau$ (for example, 2000), these points are discarded. Otherwise, a point cloud set $V_i$ is created to store the unfused three-dimensional points and associate them to $F_{K_i}$. After that, the updated depth map $F_{K_i}$ of the key frame is fused to the model. If $V_i$ is not empty, then the three-dimensional points in $V_i$ are projected to $F_{K_i}$ and fused to the model. Therefore, for each non-key frame, two fusions and one reverse fusion will be performed. Since the number of unfused points is relatively small, the fusion time required is relatively less. Therefore, computation complexity of the present disclosure is substantially slightly greater than twice of that of a conventional fusion method. If $N_{K_i}$ is relatively large and the number of the key frames no longer increases, it means that the RGB-D camera does not scan for new information, in which case $D_i$ are simply discarded.

To further reduce the redundancy of the depth data, if the current frame $F_i$ is selected as the key frame, then several point cloud sets associated to an adjacent key frame are selected and fused to the current frame. If the number of the points remaining in $V_i$ after fusion is less than $\tau$ (for example, 2000), they will be reversely fused and discarded from the model. Otherwise, the points fused to the current frame are reversely fused from the model. Considering the requirements of real-time computing, the present embodiment only integrates 5 point cloud sets.

When the pose of the key frame is adjusted by the BA, it is necessary to refuse the depth map corresponding to the key frame and the point cloud set associated therewith. However, if the number of the key frames to be adjusted is relatively large, refusion will take a lot of time, making it impossible to meet the requirements of real-time. Thus, the present disclosure limits the number of times of the refusion for each frame and distributes all refusions to each frame. In particular, the depth map corresponding to the key frame with a relatively large change in pose and the point cloud set associated therewith will be refused first. This strategy can ensure that the reconstruction portion runs at a constant speed when the BA occurs.

In order to further speed up, one frame can be fused to the model every two or more frames. This method can greatly speed up the fusion process and can be run in real time on a laptop.

The performance of the present disclosure was tested in experiments. In a PC environment with an Intel i7 3.6 GHz CPU, an 8 GB memory and a GTX 960 graphics card, the camera tracking without GPU acceleration can reach 10 to 25 milliseconds per frame. In a case of fusing each input frame, the dense reconstruction portion requires 50 milliseconds per frame, and a running speed of the entire system runs is approximately 20 fps. On a laptop configured with an i7 2.6 GHz CPU, a 16 GB RAM and a GTX960M graphics card, if one frame is fused every three frames, the running speed can reach up to 20 fps.

Figure 4:
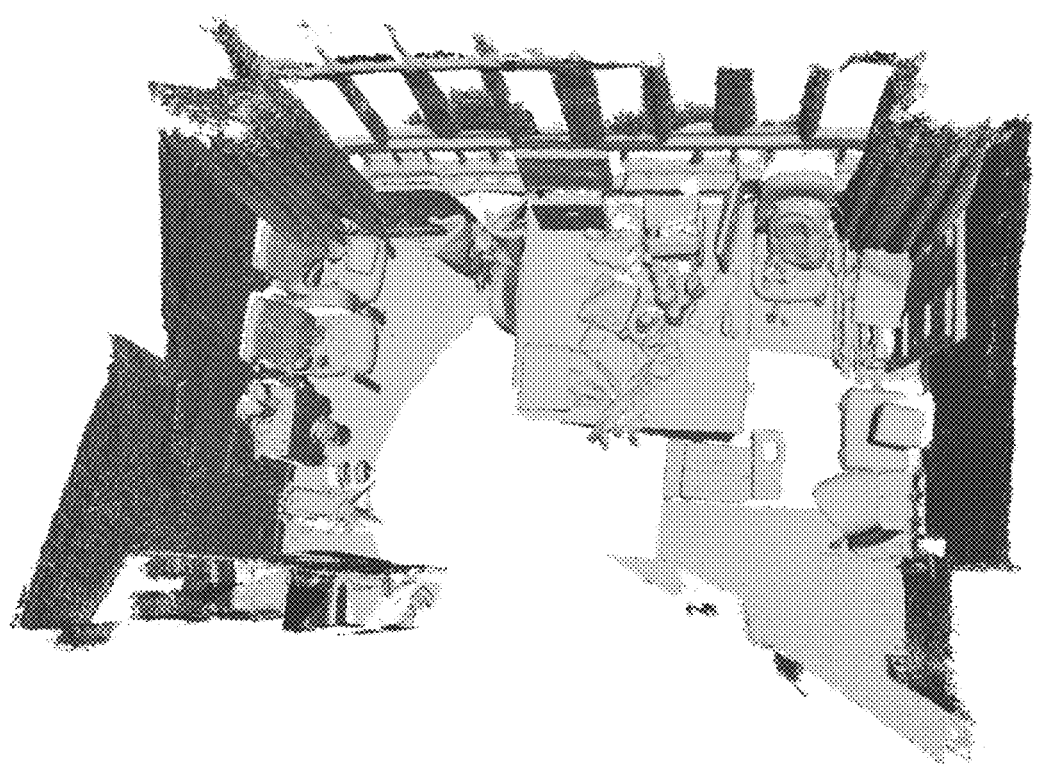
FIG. 4 illustrates a three-dimensional model generated by running on a data set taken by using ASUS Xtion Pro Live according to the present disclosure.

The algorithm performance was tested on a plurality of data sets taken with ASUS Xtion Pro Live. As shown in FIG. 4, the present disclosure can construct a high-quality model.

What is claimed is:

1. A simultaneous localization and dense three-dimensional reconstruction method, comprising:
   Step 1) of estimating a camera pose by an RGB-D alignment, and optimizing the camera pose using homography-based feature matching;
   Step 2) of running an "increment bundle adjustment" algorithm to adaptively update and optimize the camera pose of a key frame;
   Step 3) of fusing a non-key depth map to the key frame, reconstructing a three-dimensional model based on a depth map of the key frame, and updating the three-dimensional model by refusion when the camera pose changes;
   wherein the Step 1) comprises:
   for each current frame $F_i$, estimating, on a small blurry image, a relative pose $T_{(i-1) \to i}$ of a camera from a previous frame to the current frame by using the RGB-D alignment, an estimation of the relative camera pose being $C_i = T_{(i-1) \to i}C_{i-1}$;
   determining a search area $x_i^{homo}$ by using homography, and determining a search area $X_i^{RGB-D} = \pi(K(C_iC_k^{-1}(z_k K^{-1}\tilde{x}_k)))$ by using depth information $z_k$ and the estimation of the camera pose $C_i$, and searching the search area for a 3D-2D feature matching set $\chi = \{(X_j, x_j)\}$, where $X_j \in R^3$, $x_j \in R^2$ are respectively three-dimensional points and two-dimensional points, and K is a camera intrinsic;
   after the relative pose $T_{(i-1) \to i}$ and a 3D-2D feature matching set $\chi = \{(X_j, x_j)\}$ are determined, optimizing the camera pose $C_i$ by minimizing a relative error and a reprojection error:
   where $\log(T)$ maps a 3D rigid transformation $T \in SE(3)$ to $se(3)$ and returns a vector representation in $R^6$, $\|\epsilon\|_\Sigma^2 = \epsilon^T \Sigma^{-1} \epsilon$ is a standard Mahalanobis distance, $\pi([x, y, z]^T) = [x/z, y/z]$ is a projection function, K is a known and constant camera intrinsic, z(X) is used for extracting a z component from X, $z_j$ is a depth of $x_j$ at the current frame, and $\|\epsilon\|_\delta$ is a Huber norm:

if tracking fails, re-tracking a feature using a key frame-based relocalization method, otherwise, filtering the depth of the feature by using a Bayesian method based on depth information of a new feature;

for each pair of feature matching $(x_i, x_j)$ of the key frame $F_k$ and the current frame $F_i$, updating a reciprocal $\rho_k$ of an $x_k$ depth:

where $\pi^{-1}(C, x, z) = C^{-1}(zK^{-1}\tilde{x})$ and through $\rho_{i \to k}$, a filter continuously updates a joint distribution of $\rho_k$ and its inlier points; and finally, determining, when each new frame arrives, whether to select it as a key frame.

2. The simultaneous localization and dense three-dimensional reconstruction method according to claim 1, wherein the Step 2) comprises:

when a new key frame is added or a closed loop is detected, running a following increment bundle adjustment:

defining a current camera motion parameter as $C=\{C_1, C_2, \ldots, C_{n_c}\}$, $C_i \in SE(3)$, where $n_c$ is a number of cameras, defining a current three-dimensional point position as $\chi=\{X_1, X_2, \ldots X_{n_p}\}$, $X_j \in R^3$, where $n_p$ is a number of three-dimensional points, defining a set of three-dimensional points visible to the camera i as $V_i^c$, defining a set of cameras visible to a three-dimensional point j as $V_j^p$, and iterating and optimizing with a Gauss-Newton algorithm:

$$\arg\min_{C,\chi} \Sigma_i \Sigma_{j \in V_i^c} \|e(C_i, X_j)\|_2^2;$$

for each iteration, defining the current camera motion parameter as $\hat{C}=\{\hat{C}_1, \ldots, \hat{C}_{n_c}\}$, defining the current three-dimensional point position as $\hat{X}=\{\hat{X}_1, \ldots, \hat{X}_{n_p}\}$, defining an increment of the camera motion parameter as $\tilde{c}=[\tilde{c}_1^T, \ldots, \tilde{c}_{n_c}^T]^T$, $\tilde{c}_i \in R^6$, and defining an increment of the three-dimensional point position as $\tilde{x}=[\tilde{x}_1^T, \ldots, \tilde{x}_{n_p}^T]^T$, $\tilde{x}_j \in R^3$, and linearly expanding $e(C_i, X_j)$ at $(\hat{C}_i, \hat{X}_j)$:

$$e(\hat{C}_i \oplus \tilde{c}_i, \hat{X}_j + \tilde{x}_j) \approx \hat{e}_{ij} + \hat{J}_{ij}^c \tilde{c}_i + \hat{J}_{ij}^p \tilde{x}_j,$$

where $\hat{C} \oplus \tilde{c}$ denotes that a se(3) increment corresponding to $\tilde{c}$ is superimposed on $\hat{C} \in SE(3)$, and a normal equation is defined as:

$$\begin{bmatrix} U & W \\ W^T & V \end{bmatrix} \begin{bmatrix} \tilde{c} \\ \tilde{x} \end{bmatrix} = \begin{bmatrix} u \\ v \end{bmatrix},$$

U and V are diagonal block matrixes of $n_c \times n_c$, $n_p \times n_p$, respectively:

$$U = \text{diag}(U_1, \ldots, U_{n_c}); \text{ and}$$

$$V = \text{diag}(V_1, \ldots, V_{n_p});$$

for each submatrix $U_i \in R^{6 \times 6}$, $V_j \in R^{3 \times 3}$, W is a block matrix of $n_c \times n_p$:

$$W = \begin{bmatrix} W_{11} & \cdots & W_{1n_p} \\ \vdots & \ddots & \vdots \\ W_{n_c 1} & \cdots & W_{n_c n_p} \end{bmatrix};$$

for each submatrix $W_{ij} \in R^{6 \times 3}$, a right-side vector of the normal equation is:

$$u=[u_1^T, \ldots, u_{n_c}^T]^T; \text{ and}$$

$$v=[v_1^T, \ldots, v_{n_p}^T]^T;$$

for each subvector $u_i \in R^6$, $v_j \in R^3$, defining a Schur complement equation:

$$S\tilde{c}=g,$$

where, $$S=U-WV^{-1}W^T; \text{ and}$$

$$g=u-WV^{-1}v;$$

S is a block matrix of $n_c \times n_c$:

$$S = \begin{bmatrix} S_{11} & \cdots & S_{1n_c} \\ \vdots & \ddots & \vdots \\ S_{n_c 1} & \cdots & S_{n_c n_c} \end{bmatrix};$$

for each submatrix $S_{ij} \in R^{6 \times 6}$, a right-side vector of the Schur complement equation is:

$$g=[g_1^T, \ldots, g_{n_c}^T]^T;$$

for each sub-vector $g_i \in R^6$, defining auxiliary vectors $A_{ij}^U \in R^{6 \times 6}$, $A_{ij}^V \in R^{3 \times 3}$, $b_{ij}^u \in R^6$, $b_{ij}^v \in R^3$, where $i=1, \ldots, n_c$, $j \in V_i^c$, and defining auxiliary variables $A_{i_1 i_2 j}^S \in R^{6 \times 6}$, $b_{ij}^g \in R^6$, where $j=1, \ldots, n_p$, $(i_1, i_2) \in V_j^p \times V_j^p$, at an initial moment, let $U=0$, $V=0$, $W=0$, $u=0$, $v=0$, $S=0$, $g=0$, $A_{ij}^U=0$, $A_{ij}^V=0$, $b_{ij}^u=0$, $b_{ij}^v=0$, $A_{i_1 i_2 j}^S=0$, $b_{ij}^g=0$, and running following steps are run for each iteration:

a) for each three-dimensional point j and its visible camera $i \in V_j^p$, if $\hat{C}_i$ or $\hat{X}_j$ is updated in the previous iteration, then calculating $\hat{J}_{ij}^c$, $\hat{J}_{ij}^p$ and $\hat{e}_{ij}$ at $\hat{C}_i$ and $\hat{X}_j$, and updating respective variables by following formulas:

$$S_{ii} -= A_{ij}^U A_{ij}^U = (\hat{J}_{ij}^c)^T \hat{J}_{ij}^c S_{ii} += A_{ij}^U$$

$$V_j -= A_{ij}^V A_{ij}^V = (\hat{J}_{ij}^p)^T \hat{J}_{ij}^p V_j += A_{ij}^V$$

$$g_i -= b_{ij}^u b_{ij}^u = -(\hat{J}_{ij}^c)^T \hat{e}_{ij} g_i += b_{ij}^u$$

$$v_j -= b_{ij}^v b_{ij}^v = -(\hat{J}_{ij}^p)^T \hat{e}_{ij} v_j += b_{ij}^v$$

$$W_{ij} = (\hat{J}_{ij}^c)^T \hat{J}_{ij}^p;$$

b) for each three-dimensional point j, if $V_j$ is updated in the current iteration, then for the camera $i \in V_j^p$ visible to each three-dimensional point j, updating respective variables by following formulas:

$$g_i += b_{ij}^q$$

$$Y_{ij} = W_{ij} V_j^{-1}$$

$$b_{ij}^g = Y_{ij} v_j$$

$$g_i -= b_{ij}^g;$$

for a pair of cameras $(i_1, i_2) \in V_j^p \times V_j^p$ visible to the three-dimensional point j, updating respective variables by following formulas:

$$S_{i_1 i_1} += A_{i_1 i_1 j}^S A_{i_1 i_1 j}^S = Y_{i_1 j} W_{i_1 j}^T S_{i_1 i_1} -= A_{i_1 i_1 j}^S$$

$$S_{i_1 i_2} += A_{i_1 i_2 j}^S A_{i_1 i_2 j}^S = Y_{i_1 j} W_{i_2 j}^T S_{i_1 i_2} -= A_{i_1 i_2 j}^S$$

$$S_{i_2 i_2} += A_{i_2 i_2 j}^S A_{i_2 i_2 j}^S = Y_{i_2 j} W_{i_2 j}^T S_{i_2 i_2} -= A_{i_2 i_2 j}^S$$

c) solving the above Schur complement equation using a preconditioned conjugate gradient algorithm, so as to obtain a camera increment $\tilde{c}$, and for each camera i, if $|\tilde{c}_i| > \epsilon_c$, then updating $\hat{C}_i$ with $\tilde{C}_i \oplus \tilde{c}_i$;

d) for each three-dimensional point j, if $V_j$ is updated in the current iteration, or if $\hat{C}_{t_i}$ in the camera $i \in V_j^p$ is updated in the current iteration, then calculating $$\tilde{x}_j = V_j^{-1}\left(v_j - \sum\nolimits_{i \in V_j^p} W_{ij}^T \tilde{c}_v\right),$$

and if $|\tilde{x}_j| > \epsilon_p$, then updating $\hat{X}_j$ with $\hat{X}_j + \tilde{x}_j$; and e) if no camera or three-dimensional point is updated in the current iteration, or the number of iterations reaches a maximum number, then ending the loop, otherwise, repeating the Step a).

3. The simultaneous localization and dense three-dimensional reconstruction method according to claim 1, wherein the Step 3) comprises:

using a voxel-based three-dimensional model representation, each voxel recording its truncated signed nearest surface distance, and using a spatial hashing method to manage storing of the voxel on a GPU;

if the current frame $F_i$ is selected as a key frame, then directly fusing its corresponding depth map $D_i$ onto the model, for each voxel v, its truncated signed nearest surface distance being represented by $D(v)$, and a weight being represented by $W(v)$, and for each pixel x in $F_i$, updating its corresponding voxel v by a following method:

$$D'(v) = \frac{D(v)W(v) + w_i(x)D_i(x)}{W(v) + w_i(x)}, \ W'(v) = W(v) + w_i(x),$$

where $w_i(x)$ is a fusion weight of the pixel x;

if the current frame $F_i$ is not selected as a key frame, then first searching for a key frame that best matches $F_i$ and representing it as $F_{K_i}$; first, reversely fusing the depth map corresponding to the key frame $F_{K_i}$, for each pixel x, updating its corresponding voxel v by a following method:

$$D'(v) = \frac{D(v)W(v) - w_i(x)D_i(x)}{W(v) - w_i(x)}, \ W'(v) = W(v) - w_i(x),$$

where $w_i(x)$ is a fusion weight of the pixel x;

subsequently, fusing the depth map $D_i$ to $F_{K_i}$ by projecting it onto $F_{K_i}$, for each pixel x of $F_i$, a coordinate of its projection to $F_{K_i}$ being represented by y, if a reciprocal $$1/D_{F_{K_i}}(y)$$

of a depth corresponding to y and a reciprocal $1/z_x^{i \to K_i}$ of a depth of a projection point of x are smaller than a threshold $\tau_d$, then updating the depth of y to be:

$$D'(y) = w_{K_i}(y)D_{K_i}(y) + w_i(x)z_x^{i \to K_i}$$

$$w_{K_i} = w_{K_i}(y) + w_i(x);$$

for each key frame $F_{K_i}$, recording the number $N_{K_i}$ of times it is fused, and when $N_{K_i}$ is larger than a certain threshold, ending the fusion; otherwise, creating a point cloud set $V_i$ to store unfused three-dimensional points and associate them to $F_{K_i}$, after that, fusing the updated depth map $F_{K_i}$ of the key frame to the model; if $V_i$ is not empty, then projecting the three-dimensional points in $V_i$ to $F_{K_i}$ and fusing them to the model, and if $N_{K_i}$ is relatively large and the number of the key frames no longer increases, then simply discarding $D_i$;

if the current frame $F_i$ is selected as the key frame, then selecting several point cloud sets associated to an adjacent key frame and fusing them to the current frame, if the number of the points remaining in $V_i$ after fusion is relatively small, then reversely fusing them and discarding them from the model, otherwise, reversely fusing the points fused to the current frame from the model; and finally, limiting the number of times of the refusion for each frame and distributing all refusion operations to each frame.

4. A simultaneous localization and dense three-dimensional reconstruction method, comprising:

Step 1) of estimating the camera pose by an RGB-D alignment, and optimizing the camera pose using homography-based feature matching;

Step 2) of running an "increment bundle adjustment" algorithm to adaptively update and optimize the camera pose of a key frame;

Step 3) of fusing a non-key depth map to the key frame, reconstructing a three-dimensional model based on a depth map of the key frame, and updating the three-dimensional model by refusion when the camera pose changes;

wherein the Step 2) comprises:

when a new key frame is added or a closed loop is detected, running a following increment bundle adjustment:

defining a current camera motion parameter as $C = \{C_1, C_2, \ldots, C_{n_c}\}$, $C_i \in SE(3)$, where $n_c$ is a number of cameras, defining a current three-dimensional point position as $\chi = \{X_1, X_2, \ldots, X_{n_p}\}$, $X_j \in R^3$, where $n_p$ is a number of three-dimensional points, defining a set of three-dimensional points visible to the camera i as $V_i^c$, defining a set of cameras visible to a three-dimensional point j as $V_j^p$, and iterating and optimizing with a Gauss-Newton algorithm:

$$\operatorname{argmin}_{C,\chi} \sum_i \sum_{j \in V_i^c} \|e(C_i, X_j)\|_2^2,$$

for each iteration, defining the current camera motion parameter as $\hat{C} = \{\hat{C}_1, \ldots, \hat{C}_{n_c}\}$, defining the current three-dimensional point position as $\hat{X} = \{\hat{X}_1, \ldots, \hat{X}_{n_p}\}$, defining the increment of the camera motion parameter as $\tilde{c} = [\tilde{c}_1^T, \ldots, \tilde{c}_{n_c}^T]^T$, $\tilde{c}_i \in R^6$, and defining an increment of the three-dimensional point position as $\tilde{x} = [\tilde{x}_1^T, \ldots, \tilde{x}_{n_c}^T]$, $\tilde{x}_j \in R^3$, and linearly expanding $e(C_i, X_j)$ at $(\hat{C}_i, \hat{X}_j)$:

$$e(\hat{C}_i \oplus \tilde{c}_i, \hat{X}_j + \tilde{x}_j) \approx \hat{e}_{ij} + \hat{j}_{ij}^c \tilde{c}_i + \hat{j}_{ij}^p \tilde{x}_j,$$

where $\hat{C} \oplus \tilde{c}$ denotes that a se(3) increment corresponding to $\tilde{c}$ is superimposed on $\hat{C} \in SE(3)$, and a normal equation is defined as:

$$\begin{bmatrix} U & W \\ W^T & V \end{bmatrix} \begin{bmatrix} \tilde{c} \\ \tilde{x} \end{bmatrix} = \begin{bmatrix} u \\ v \end{bmatrix},$$

U and V are diagonal block matrixes of $n_c \times n_c$, $n_p \times n_p$, respectively:

$$U = \text{diag}(U_1, \ldots, U_{n_c}); \text{ and}$$

$$V = \text{diag}(V_1, \ldots, V_{n_p});$$

for each submatrix $U_i \in R^{6 \times 6}$, $V_j \in R^{3 \times 3}$, W is a block matrix of $n_c \times n_p$:

$$W = \begin{bmatrix} W_{11} & \cdots & W_{1n_p} \\ \vdots & \ddots & \vdots \\ W_{n_c 1} & \cdots & W_{n_c n_p} \end{bmatrix};$$

for each submatrix $W_{ij} \in R^{6 \times 3}$, a right-side vector of the normal equation is:

$$u = [u_1^T, \ldots, u_{n_c}^T]^T; \text{ and}$$

$$v = [v_1^T, \ldots, v_{n_p}^T]^T;$$

for each subvector $u_i \in R^6$, $v_j \in R^3$, defining a Schur complement equation:

$$S\tilde{c} = g,$$

where, $$S = U - WV^{-1}W^T; \text{ and}$$

$$g = u - WV^{-1}v,$$

S is a block matrix of $n_c \times n_c$:

$$S = \begin{bmatrix} S_{11} & \cdots & S_{1n_c} \\ \vdots & \ddots & \vdots \\ S_{n_c 1} & \cdots & S_{n_c n_c} \end{bmatrix};$$

for each submatrix $S_{ij} \in R^{6 \times 6}$, a right-side vector of the Schur complement equation is:

$$g = [g_1^T, \ldots, g_{n_c}^T]^T;$$

for each sub-vector $g_i \in R^6$, defining auxiliary vectors $A_{ij}^U \in R^{6 \times 6}$, $A_{ij}^V \in R^{3 \times 3}$, $b_{ij}^u \in R^6$, $b_{ij}^v \in R^3$, where $i = 1, \ldots, n_c$, $j \in V_i^c$, and defining auxiliary variables $A_{i_1 i_2 j}^S \in R^{6 \times 6}$, $b_{ij}^g \in R^6$, where $j = 1, \ldots, n_p$, $(i_1, i_2) \in V_j^p \times V_j^p$, at an initial moment, let $U=0$, $V=0$, $W=0$, $u=0$, $v=0$, $S=0$, $g=0$, $A_{ij}^U=0$, $A_{ij}^V=0$, $b_{ij}^u=0$, $b_{ij}^v=0$, $A_{i_1 i_2 j}^S=0$, $b_{ij}^g=0$, and running following steps are run for each iteration:

a) for each three-dimensional point j and its visible camera $i \in V_j^P$, if $\hat{C}_i$ or $\hat{X}_j$ is updated in the previous iteration, then calculating $\hat{J}_{ij}^c$, $\hat{J}_{ij}^p$, and $\hat{e}_{ij}$ at $\hat{C}_i$ and $\hat{X}_j$, and updating respective variables by following formulas:

$$S_{ii} -= A_{ij}^U, A_{ij}^U = (\hat{J}_{ij}^c)^T \hat{J}_{ij}^c, S_{ii} += A_{ij}^U$$

$$V_j -= A_{ij}^V, A_{ij}^V = (\hat{J}_{ij}^p)^T \hat{J}_{ij}^p, V_j += A_{ij}^V$$

$$g_i -= b_{ij}^u, b_{ij}^u = -(\hat{J}_{ij}^c)^T \hat{e}_{ij}, g_i += b_{ij}^u$$

$$v_j -= b_{ij}^v, b_{ij}^v = -(\hat{J}_{ij}^p)^T \hat{e}_{ij}, v_j += b_{ij}^v$$

$$W_{ij} = (\hat{J}_{ij}^c)^T \hat{J}_{ij}^p;$$

b) for each three-dimensional point j, if $V_j$ is updated in the current iteration, then for the camera $i \in V_j^P$ visible to each three-dimensional point j, updating respective variables by following formulas:

$$g_i += b_{ij}^q$$

$$Y_{ij} = W_{ij} V_j^{-1}$$

$$b_{ij}^g = Y_{ij} v_j$$

$$g -= b_{ij}^g;$$

for a pair of cameras $(i_1, i_2) \in V_j^P \times V_j^P$ visible to the three-dimensional point j, updating respective variables by following formulas:

$$S_{i_1 i_1} += A_{i_1 i_1 j}^S, A_{i_1 i_1 j}^S = Y_{i_1 j} W_{i_1 j}^T, S_{i_1 i_1} -= A_{i_1 i_1 j}^S$$

$$S_{i_1 i_2} += A_{i_1 i_2 j}^S, A_{i_1 i_2 j}^S = Y_{i_1 j} W_{i_2 j}^T, S_{i_1 i_2} -= A_{i_1 i_2 j}^S$$

$$S_{i_2 i_2} += A_{i_2 i_2 j}^S, A_{i_2 i_2 j}^S = Y_{i_2 j} W_{i_2 j}^T, S_{i_2 i_2} -= A_{i_2 i_2 j}^S$$

c) solving the above Schur complement equation using a preconditioned conjugate gradient algorithm, so as to obtain a camera increment E, and for each camera i, if $|\tilde{c}_i| > \epsilon_c$, then updating $\hat{C}_i$ with $\hat{C}_i \oplus \tilde{c}_i$;

d) for each three-dimensional point j, if $V_j$ is updated in the current iteration, or if $\hat{C}_{i_j}$ in the camera $i \in V_j^P$ is updated in the current iteration, then calculating $$\tilde{x}_j = V_j^{-1} \left( v_j - \sum_{i \in V_j^P} W_{ij}^T \tilde{c}_v \right),$$

and if $|\tilde{x}_j| > \epsilon_p$, then updating $\hat{X}_j$ with $\hat{X}_j + \tilde{x}_j$; and e) if no camera or three-dimensional point is updated in the current iteration, or the number of iterations reaches a maximum number, then ending the loop, otherwise, repeating the Step a).

5. A simultaneous localization and dense three-dimensional reconstruction method, comprising:

Step 1) of estimating the camera pose by an RGB-D alignment, and optimizing the camera pose using homography-based feature matching;

Step 2) of running an "increment bundle adjustment" algorithm to adaptively update and optimize the camera pose of a key frame;

Step 3) of fusing a non-key depth map to the key frame, reconstructing a three-dimensional model based on a depth map of the key frame, and updating the three-dimensional model by refusion when the camera pose changes;

wherein the Step 3) comprises:

using a voxel-based three-dimensional model representation, each voxel recording its truncated signed nearest surface distance, and using a spatial hashing method to manage storing of the voxel on a GPU;

if the current frame $F_i$ is selected as a key frame, then directly fusing its corresponding depth map $D_i$ onto the model, for each voxel v, its truncated signed nearest surface distance being represented by D(v), and a weight being represented by W(v), and for each pixel x in $F_i$, updating its corresponding voxel v by a following method:

$$D'(v) = \frac{D(v)W(v) - w_i(x)D_i(x)}{W(v) - w_i(x)}, \quad W'(v) = W(v) - w_i(x),$$

where $w_i(x)$ is a fusion weight of the pixel x;

if the current frame $F_i$ is not selected as a key frame, then first searching for a key frame that best matches $F_i$ and representing it as $F_{K_i}$; first, reversely fusing the depth map corresponding to the key frame $F_{K_i}$, for each pixel x, updating its corresponding voxel v by a following method:

$$D'(v) = \frac{D(v)W(v) - w_i(x)D_i(x)}{W(v) - w_i(x)}, \quad W'(v) = W(v) - w_i(x),$$

where $w_i(x)$ is a fusion weight of the pixel x;

subsequently, fusing the depth map $D_i$ to $F_{K_i}$ by projecting it onto $F_{K_i}$, for each pixel x of $F_i$, a coordinate of its projection to $F_{K_i}$ being represented by y, if a reciprocal $$(1/D_{F_{K_i}}(y))$$

of a depth corresponding to y and a reciprocal $1/z_x^{i \to K_i}$ of a depth of a projection point of x are smaller than a threshold $\tau_d$, then updating the depth of y to be:

$$D'(y) = w_{K_i}(y)D_{K_i}(y) + w_i(x)z_x^{i \to K_i}$$

$$w_{K_i} = w_{K_i}(y) + w_i(x);$$

for each key frame $F_{K_i}$, recording the number $N_{K_i}$ of times it is fused, and when $N_{K_i}$ is larger than a certain threshold, ending the fusion; otherwise, creating a point cloud set $V_i$ to store unfused three-dimensional points and associate them to $F_{K_i}$, after that, fusing the updated depth map $F_{K_i}$ of the key frame to the model; if $V_i$ is not empty, then projecting the three-dimensional points in $V_i$ to $F_{K_i}$ and fusing them to the model, and if $N_{K_i}$ is relatively large and the number of the key frames no longer increases, then simply discarding $D_i$;

if the current frame $F_i$ is selected as the key frame, then selecting several point cloud sets associated to an adjacent key frame and fusing them to the current frame, if the number of the points remaining in $V_i$ after fusion is relatively small, then reversely fusing them and discarding them from the model, otherwise, reversely fusing the points fused to the current frame from the model; and finally, limiting the number of times of the refusion for each frame and distributing all refusion operations to each frame.

\* \* \* \* \*